United States Patent [19]

Muscat

[11] Patent Number: 4,799,729
[45] Date of Patent: Jan. 24, 1989

[54] TONNEAU COVER MECHANISM FOR CONVERTIBLE AUTOMOBILES

[76] Inventor: Peter P. Muscat, 14980 Waterfall Rd., Northville, Mich. 48167

[21] Appl. No.: 85,407

[22] Filed: Aug. 14, 1987

Related U.S. Application Data

[63] Continuation-in-part of Ser. No. 720,349, May 13, 1985, Pat. No. 4,687,247.

[51] Int. Cl.⁴ .............................................. B60J 7/20
[52] U.S. Cl. .................................. 296/136; 296/37.16; 160/210
[58] Field of Search .................... 296/37.16, 65 R, 66, 296/67, 68, 107, 136; 160/210, 212, 213

[56] References Cited

U.S. PATENT DOCUMENTS

| | | | |
|---|---|---|---|
| 1,415,332 | 5/1922 | Gebhard | 296/136 |
| 1,437,351 | 11/1922 | Oelsner | 296/117 |
| 2,599,277 | 6/1952 | Orr | 296/107 |
| 2,959,447 | 11/1960 | Stebbins et al. | 296/136 X |
| 2,992,042 | 7/1961 | Gilson et al. | 296/136 |
| 3,172,695 | 3/1965 | Bordinat, Jr. | 296/136 X |
| 4,687,247 | 8/1987 | Muscat | 296/136 |

FOREIGN PATENT DOCUMENTS

| | | | |
|---|---|---|---|
| 30190 | 8/1922 | Denmark | 296/136 |
| 296201 | 2/1916 | Fed. Rep. of Germany | 296/136 |
| 306849 | 9/1916 | Fed. Rep. of Germany | 296/136 |
| 332315 | 7/1918 | Fed. Rep. of Germany | 296/136 |

Primary Examiner—Dennis H. Pedder
Attorney, Agent, or Firm—John R. Benefiel

[57] ABSTRACT

A tonneau cover mechanism is disclosed in manual and power-operated versions, the mechanism made up of an assembly of rigid panels configured to cover the convertible top storage space of a convertible automobile with the top either raised or lowered. The panel assembly includes a pair of inwardly movable side covers configured to cover side well regions of the storage space on either side of a passenger seat as well as the adjacent rear areas, and a main tonneau panel cantilevered from the upper edge of a hinged body panel defining the rear of the passenger compartment. The body panel hinge mount allows forward tilting motion which carries the main tonneau panel off the storage space and allows the convertible top to be raised or lowered. The side covers are also moved inwardly off the side well regions of the storage space upon tilting of the seat. Upon rearward tilting movement of the body panel, the panel assembly is repositioned overlying the storage space. In the powered version, the side panels are displaced inwardly and carried forward with the body panel tilting motion, while in the manual version the side covers are pivoted inwardly and forwardly about fixed pivots by a linkage mechanism interconnecting the side covers and the body panel.

5 Claims, 8 Drawing Sheets

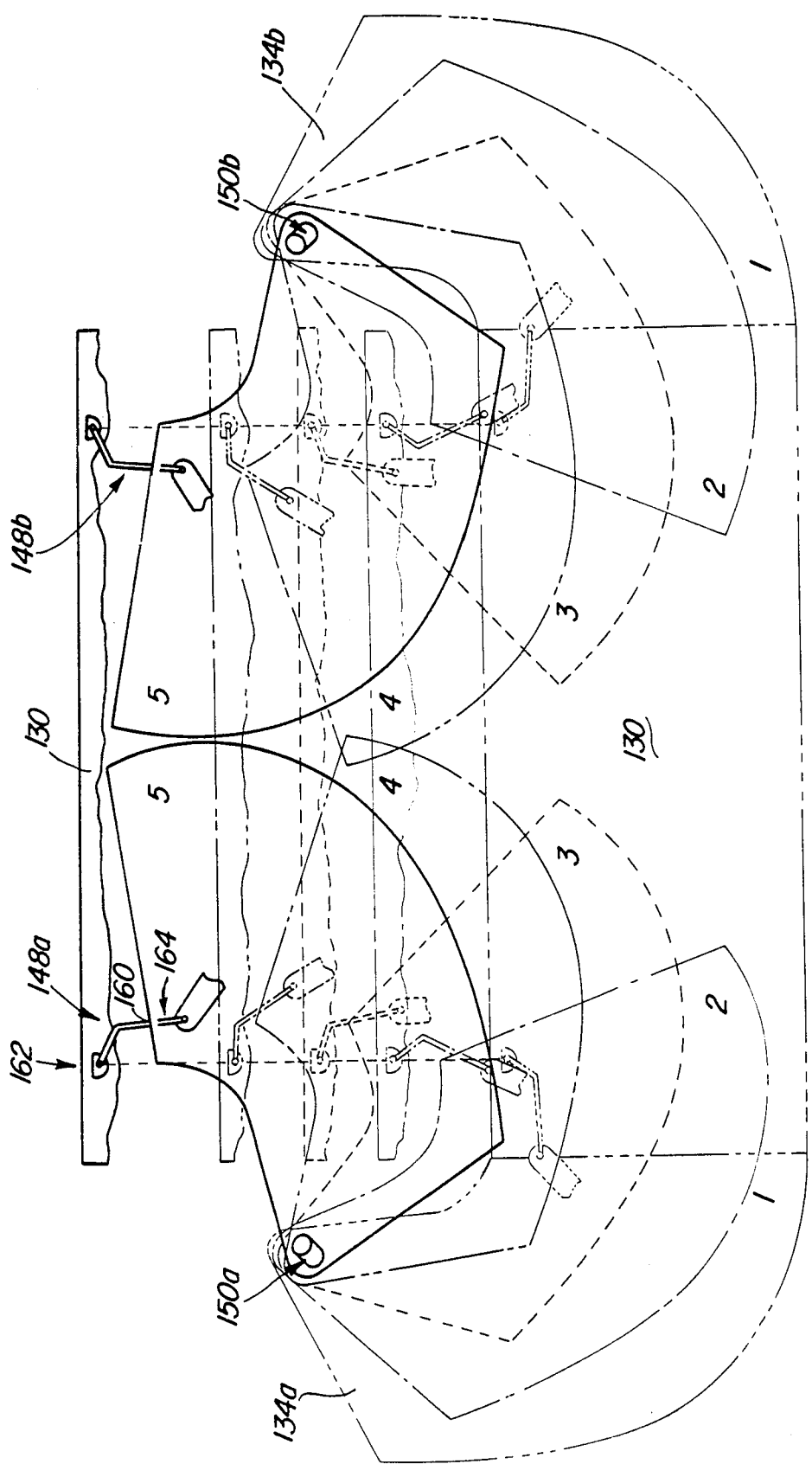

TONNEAU COVER MECHANISM FOR CONVERTIBLE AUTOMOBILES

CROSS REFERENCE TO RELATED APPLICATION

This application is a continuation-in-part of Ser. No. 720,349, filed May 13, 1985, now U.S. Pat. No. 4,687,247.

BACKGROUND OF THE INVENTION

This invention concerns convertible automobiles and more particularly tonneau cover arrangements for convertible tops.

Convertible automobile bodies include a storage space to the rear and sides of the passenger compartment, usually immediately to the rear of a side-by-side passenger seat mounted within the passenger compartment of the automobile into which the convertible top is collapsed for storage. The storage space is usually configured having a first region extending immediately to the rear of the seat receiving the fabric top and the bow frame members, and side regions alongside the seat to accommodate the frame rail members.

For styling purposes, the storage space area is covered with a tonneau cover, usually consisting of the fabric cover manually fastened over the storage space with the convertible top in the stored position. Alternatively, a rigid panel is adapted to be mounted in a position overlying the storage area flush with the surrounding body surfaces.

It is highly desirable for aesthetic purposes that a tonneau cover be adapted to overlie the storage space with the convertible top in either the stored or up position to provide a finished interior appearance to the passenger compartment. It is also highly desirable that a simplified actuation of the tonneau cover be allowed in order to enhance the convenience of raising and lowering the convertible top.

In the instance of the movable hard tonneau panel, one arrangement heretofore known involves a rear hinged tonneau panel which is raised in order to allow movement of the top frame into and out of the storage space with the tonneau cover thereafter lowered into position. In this design, the rear of the top frame must be subsequently secured to the tonneau panel after raising the top and lowering of the tonneau panel in order to close the tonneau panel with the top in the "up" position.

That is, the top is first raised, the tonneau panel lowered past a partially elevated rear section of the top frame, with the rear section of the top frame then subsequently secured to the tonneau panel to complete the top raising operation. This obviously is a relatively complicated top raising procedure, lessening the convenience of raising the convertible top.

In prior U.S. Pat. Nos. 2,992,042 and 2,959,447, there is disclosed relatively complex power mechanisms for positioning rigid tonneau cover panels configured to overlie a storage space provided for an automobile convertible top.

U.S. Pat. No. 2,599,277 to Orr discloses a tonneau panel alternatively hinged or removable from a manually operated rear body panel, with separate removable side well covers.

While not involving complex power mechanisms, the tonneau cover arrangement of Orr requires a series of separate manual steps, relatively inconvenient to execute in raising or lowering the top.

Accordingly, it is an object of the present invention to provide a tonneau cover mechanism in which a hard panel cover assembly is adapted to cover the storage space in a covertible automobile body in both the top raised and stored positions, which allows for simplified tonneau cover actuation by a two-step process which does not necessitate the attachment of the rear of the convertible top to the tonneau cover panel.

It is another object of the present invention to provide a tonneau cover mechanism which is quickly and conveniently operated.

SUMMARY OF THE INVENTION

These and other objects of the present invention, which will be appreciated upon a reading of the following specification and claims, are achieved by providing a tonneau panel assembly, including a tonneau panel attached to a hinged body panel located just forwardly of the rear storage area and between side well regions thereof. The tonneau panel is cantilevered at a fixed angle to the upper edge of the body panel to overlie the storage space with the body panel in an upright position.

Forward tilting motion of the interior body panel carries the cantilevered panel forwardly to completely expose the storage space and enable the convertible top to be raised or lowered past the now forward positioned tonneau panel.

The tonneau cover arrangement also includes a pair of side panels configured to extend over the storage areas alongside the seat and the adjacent rear areas of the storage space.

In a first power-operated version, the side panels are mounted for powered inward movement prior to powered forward tilting of the interior body panel in order to uncover the side storage areas.

The side panels include a pair of lap panels, each mounted atop one of the side panels adjacent the inboard edge to overlie the tonneau panel, such that the in-and-out movement of the side panels is accommodated without exposing a gap.

In the first version, the in-and-out movement of the side panels as well as the tilting motion of the panel is accomplished by a rack and gear drive arrangement powered by a rotary drive unit and a series of rotary drive cables driving respective pinion gear drive units.

In the power-operated version, the drive mechanism includes an elongated track having a gear rack attached thereto and a guide member receiving the elongated track member, carrying the rotary pinion gear drive unit, with the track and guide members mounted to the body panel and vehicle body respectively so that powered motion of the body panel occurs upon rotation of the pinion gear.

The panel drive includes a pair of panel flange members slidably received in either end of an elongated guide member mounted along the upper edge of the seat, with gear racks mounted to each flange member and a respective pinion gear drive unit mounted to the guide member located to engage each rack gear and cause in-and-out movement of the side panels upon rotation of the respective pinion gears by respective flexible drive cables. The second version of the present invention involves a completely manual operation, in which covering and uncovering movement of the entire panel assembly is accomplished by tilting of the interior body panel, which alternatively may move the main tonneau panel away from or above the storage space. Simultaneously, a pair of side covers are pivoted to be moved over or off side well regions of the storage space. In the uncovering pivoting motion, the side covers are moved beneath the main tonneau panel. The pivoting movement of each side cover is accomplished by linkage means interengaging the interior body panel-main tonneau panel structure and each side cover.

In the uncovering position, with the interior body panel tilted forward and the side covers pivoted inboard, clearance is provided above the storage space to allow raising or lowering of the convertible top. The tonneau panel assembly is quickly repositioned over the storage space by merely restoring the interior body panel to its normal upright position.

BRIEF DESCRIPTION OF THE DRAWINGS

FIG. 20 is a diagrammatic plan view of the tonneau cover mechanism shown in FIGS. 11-14, with the components thereof shown in successive positions assumed during opening or closing.

DETAILED DESCRIPTION

Figure 1:
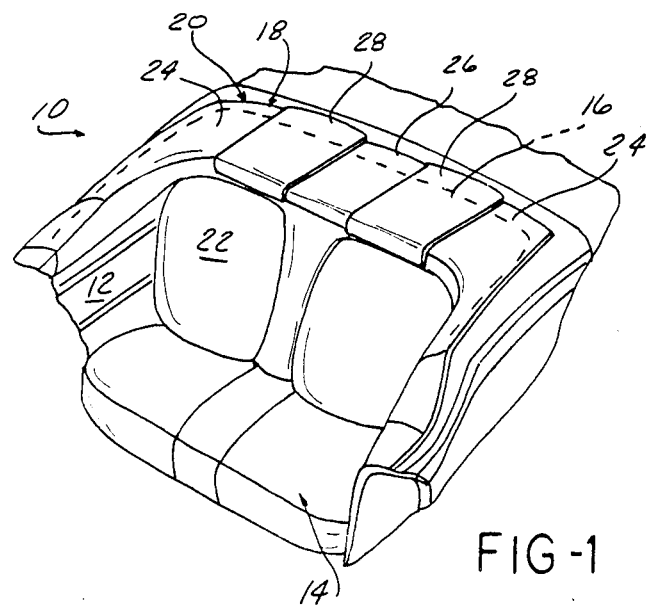
FIG. 1 is a fragmentary perspective view of a convertible automobile showing the tonneau cover arrangement according to the present invention.

Referring to the drawings and particularly FIG. 1, the power tonneau cover arrangement according to the present invention is adapted for use with convertible automobiles of the type having a vehicle body 10 defining a passenger compartment 12 in which is mounted a rear seat 14. The vehicle body 10 has portions defining a storage space 16 having areas thereof immediately to the rear of the back panel 40 and also side well regions along either side thereof to accommodate the convertible top frame members and covering (not shown).

The tonneau cover arrangement 18 according to the present invention includes a tonneau panel assembly 20 configured to cover the storage space 16 in the region immediately to the rear of the back panel 40 and also side wells alongside the seat 14 as indicated.

According to the concept of the present invention the tonneau panel assembly 20 is mounted to the upper edge 22 of the back panel 40 so as to extend at a fixed angle, be cantilevered, normally extending to the rear over the storage space 16. The tonneau panel assembly 20 in this version includes a pair of rigid movable side panels 24 mounted to be movable laterally in and out, towards and away from a fixed main tonneau panel 26 with each of the side panels 24 carrying a lap panel 28 to accommodate the in and out movement without exposing a gap throughout the range of in and out motion of the side panels 24.

Each of the side panels 24, main panel 26, and the lap panels 28 include lip portions as shown in FIG. 1 extending downwardly over the adjacent portions of the body and seat 14 to provide a smooth aesthetically pleasing finished appearance.

The convertible top (not shown) is adapted to be moved in and out of the storage space in which it is stored in being moved to the raised or stowed positions, upon movement of the tonneau panel assembly 20 out of position overlying the storage space 16.

This movement is accomplished by a two step actuation of the tonneau panel assembly 20 as depicted diagrammatically in FIGS. 2 through 4 and 5 through 7.

Figure 2:
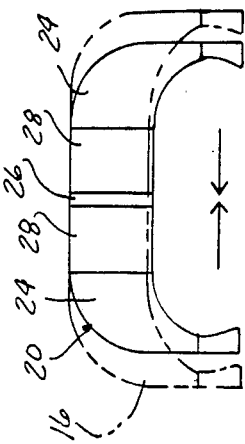
FIGS. 2-4 are diagrammatic views of the tonneau panel assembly according to the present invention depicting successive stages of actuation of the side panels moving inwardly.
Figure 3:
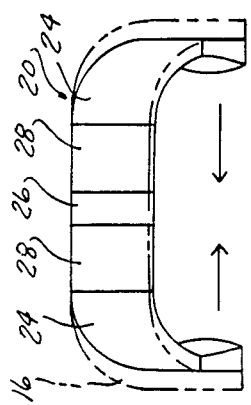

In FIG. 2, the tonneau panel assembly 20 is shown in position entirely overlying the storage space 16, with the rear edge tight against weather stripping seal 32 mounted on the body 34 extending around the rear of the storage space 16. In FIG. 3, the side panels 24 have begun inward motion, partially exposing the storage space 16 with the lapping panels 28 narrowing the exposed section of main tonneau panel 26.

Figure 4:
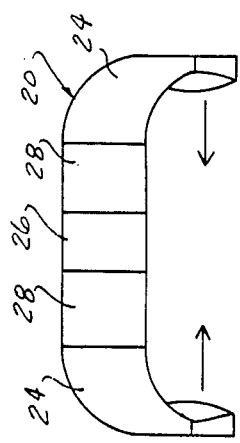

In FIG. 4, the inward movement of the panels is complete, and each of the side panels 24 have moved sufficiently laterally towards each other to clear the body structure defining the side panels 24 of the storage space 16.

As will be described hereinafter in further detail, the tonneau panel assembly 20, is rigidly fixed be cantilevered from the upper edge of the body panel 40 extending to the rear to normally overlie the storage space 16. The passenger seat 22 is hinge mounted such as to be able to be tilted forward as by an actuating mechanism 30 shown in FIGS. 5-7.

Figure 7:
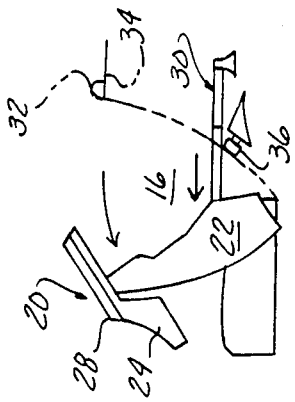
FIGS. 5-7 are diagrammatic representations of the tonneau panel assembly according to the present invention depicting successive stages of the seat tilting motion.
Figure 6:
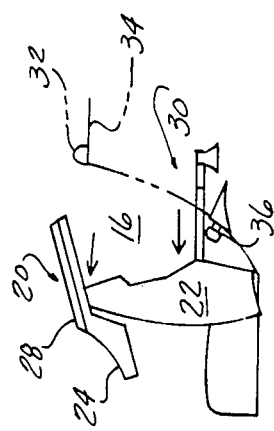
Figure 5:
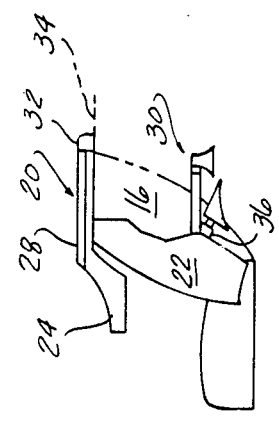

Subsequently, after the inward motion of the side panels 24 is completed, the actuating device 30 is operated to move the passenger seat 22 body panel 40 from the generally vertical position shown in FIG. 5, with the tonneau panel assembly 20 overlying the storage space 16 and the seat 22 held against fixed stops 36 mounted in the interior of storage space 16. This movement is shown as partially completed in FIG. 6, beginning to open up the storage space 16. Upon completion, the opening movement is sufficient to fully open the storage space 16 as shown in FIG. 7, so as to allow the convertible top to be moved into or out of the storage space 16 past the cantilevered tonneau panel assembly.

The actuating device 30 thereafter returns the passenger seat 22 against the fixed stop 36.

Figure 9:
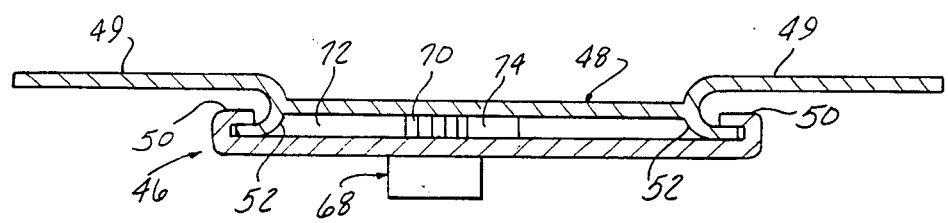
FIG. 9 is a view of the section 9—9 taken in FIG. 8.
Figure 10:
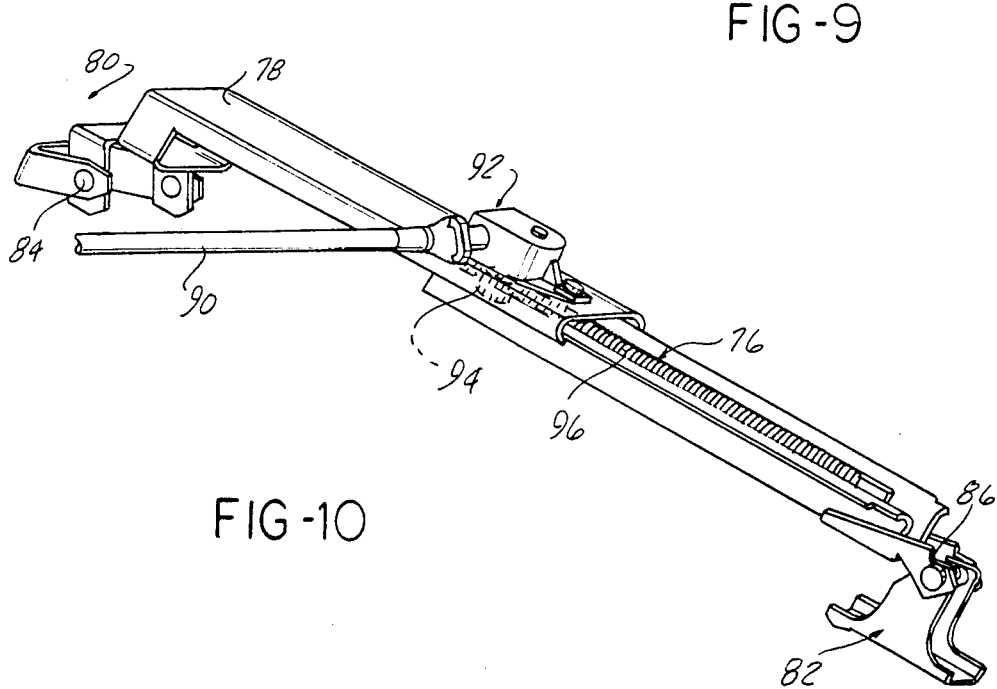
FIG. 10 is an enlarged perspective view of the seat drive mechanism shown in FIG. 8.
Figure 8:
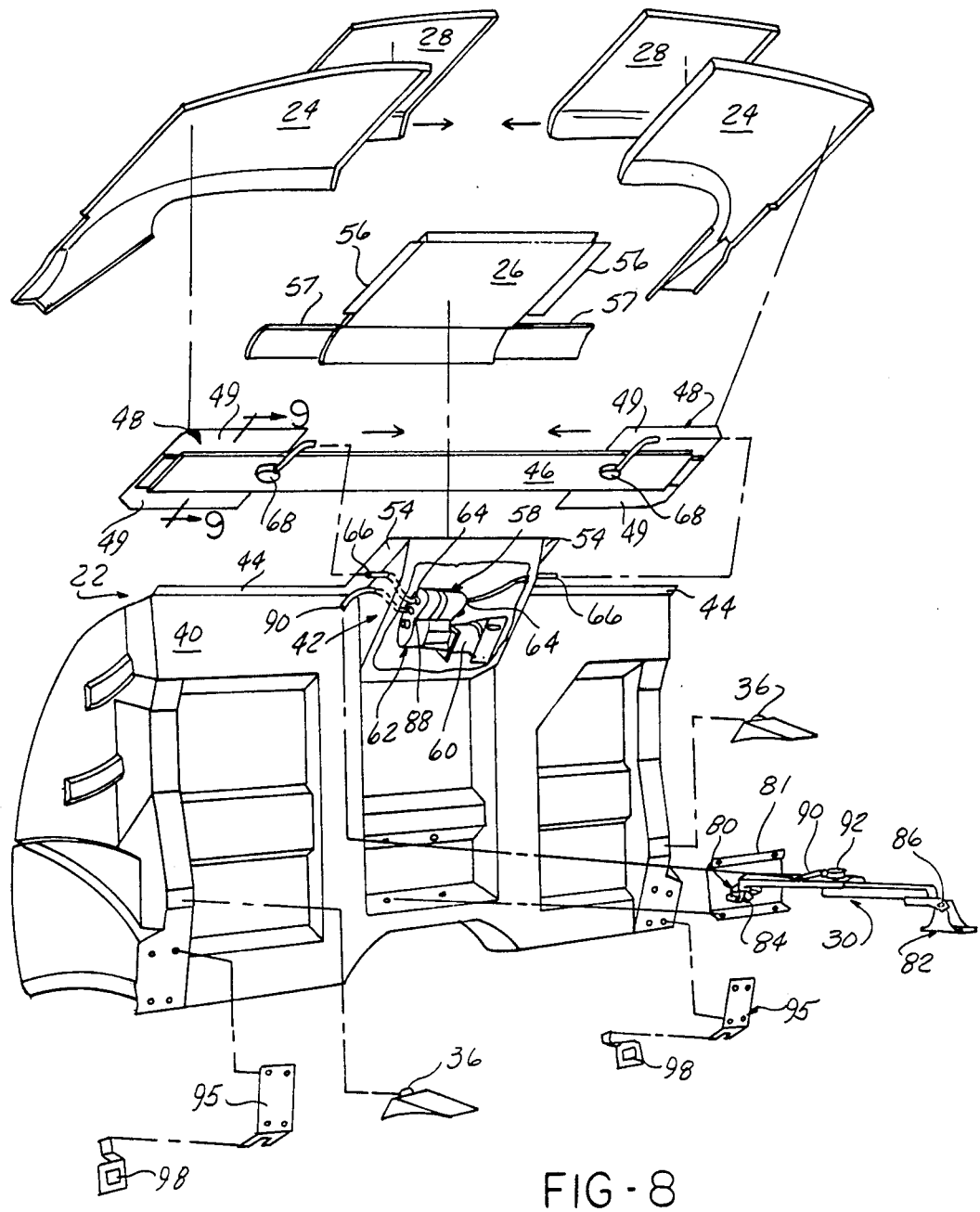
FIG. 8 is an exploded perspective view of the components comprising the power tonneau cover arrangement according to the present invention.

Referring to FIGS. 8-10, the details of construction of the tonneau cover arrangement 10 according to the present invention are depicted. Each of the side panels 24, the lap panels 28 and the main panel 26 are preferably formed of a light weight yet rigid construction such as a molded resin covered with a decorative surfacing material such as textured vinyl.

The side panels 24 are shaped with an "arm" portion shaped to cover the side region of the storage space 16 alongside the passenger seat 22, with the remaining portion shaped to cover the portion of the region of the storage space 16 adjacent the side regions immediately to the rear of the passenger seat 22.

Each of the side panels 24 is fastened to a respective lap panel 28, as by means of threaded fasteners (not shown), with the lap panel 28 positioned on the inboard side of a respective attached side panel 24. The passenger seat 22 includes the interior body panel 40 of formed metal, previously noted having an upper central region thereof shaped to define an enclosure 42, with mounting flanges 44 extending along the upper edge and flanges 54 on either side of the enclosure 42 as shown.

Elongated guide member 46 is fastened to the flange 44 as by threaded fasteners (not shown) such as to be securely mounted thereto extending transversely across the passenger compartment. The elongated guide member 46 in turn slidably receives a pair of flanged members 48 each secured to a respective side panel 24 as by threaded fasteners. The flange member 48 and guide track 46 are interfit as shown in FIG. 9 to allow the guided in and out movement of the side panels 24 which are attached to flanges 49 of the flange member 48 as by threaded fasteners (not shown). The guide member 46 is formed with a lip on either lengthwise edge thereof into which is interfit lips 52 formed on either side of the respective flange member 48. The main panel 26 is fit over the elongated guide member 46 and mounted as by means of threaded fasteners (not shown) to the flange 56 formed on the center panel and flanges 54 adjacent the enclosure 42.

A sheet metal member 57 is provided having ends each underlying a respective side panel 24 to support the free end of the side panel during its in and out motion.

Drive means are provided in order to provide powered actuation of the in-and-out movement of the flange members 48 and the attached side panels 24. This includes a rotary drive assembly 58 mounted within the enclosure 42 and adapted to provide a rotary output, including an electric motor 60 driving a geared reducer 62 as are commercially available to provide a rotary output 64 on either end driving rotary flexible drive cables 66. The drive cables 66 are connected to in turn drive right angle drive units 68 each of a type commercially available, mounted on the under side of a respective guide track 46 as shown in FIG. 9. The right angle drive 68 includes an output pinion gear 70 disposed in a space 72 created between the flange member 48 and the elongated guide member 46. Fastened to the under surface of the flange member 48 is an elongated rack gear 74 engaged with the pinion gear 70 such that upon rotation of the pinion gear, the flange member 48 is caused to traverse in the elongated guide member 46 to carry the side panels 24 in their in and out movement.

The rotary drive assembly 58 also provides rotary power to allow powered actuation of the passenger seat 22 and body panel 40 through their tilting motion. The actuator 30 as best seen in FIG. 10, includes an elongated track member 76 received within a guide member 78 each connected respectively to plate 81 affixed to interior body panel 40 and the body portion adjacent to storage space 16 by means of mounting brackets 80 and 82 respectively and pivoted at 84 and 86 to accommodate the tilting movement of the passenger seat 22. The gear reducer 62 is also provided with a rotary output 88 driving a flexible drive element 90 which in turn drives a right angle drive 92 mounted to the guide member 78 as shown in FIG. 10.

The right angle drive unit 92 includes an output pinion gear 94 in driving engagement with a rack gear 96 mounted to the elongated track member 76. Rotation of flexible drive element 90 and pinion gear 94 accordingly produces relative movement of the elongated member 76 and the guide member 78 towards or away from each other to thereby produce powered tilting movement of the interior body panel 40 and passenger seat 22 towards or away from the vertical position against the fixed stops 36 in storage space 16. Fixed stops may be spring mounted to accommodate a slight lost motion during seating.

The interior body panel 40 has mounted thereto a spaced pair of hinge members 95 and mating hinge members 98 mounted to the body portions adjacent the lower end of the passenger seat 22 as indicated in FIG. 8, to enable the tilting motion described.

Each of the right angle drives 68 and 92 are preferably of a self locking nature such as a worm gear drive so as to fix the position of the side panels 24 and the passenger seat 22 whenever the rotary drive is not actuated.

Figure 11:
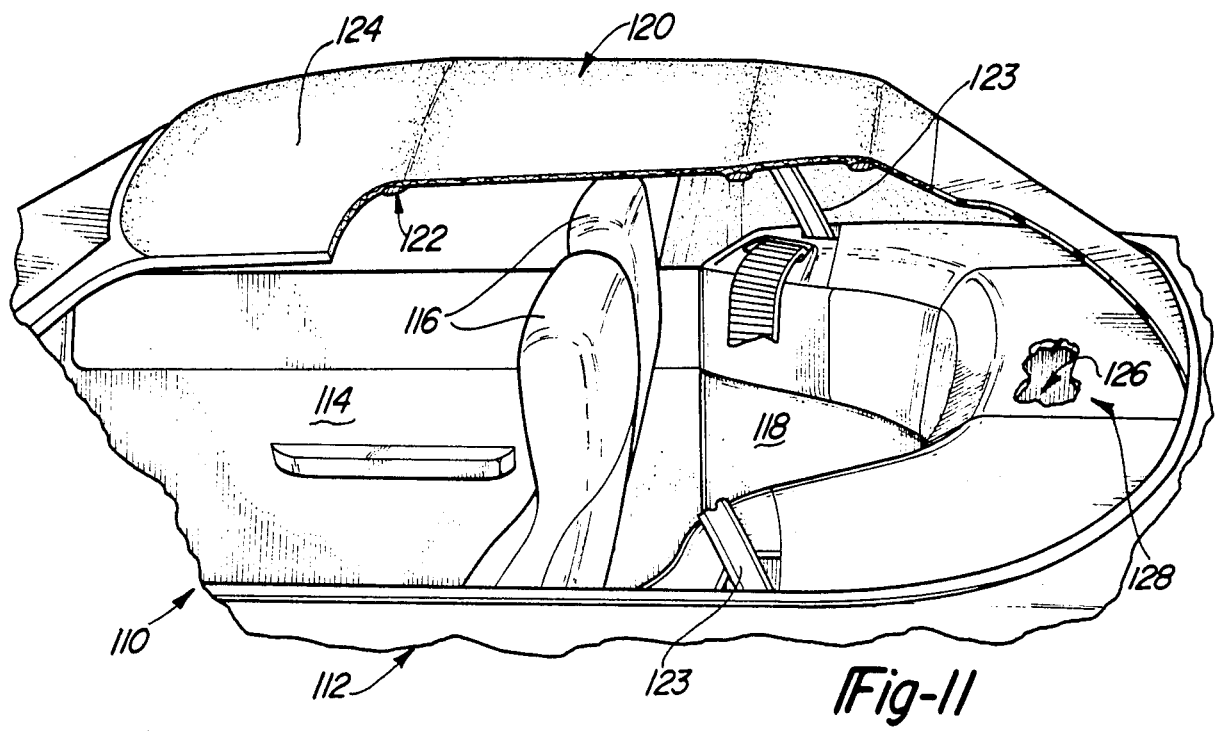
FIG. 11 is a fragmentary perpsective side view of a convertible top automobile, with the top raised and the tonneau mechanism according to the present invention in its normal, covering position.

Referring to FIGS. 11-20 of the drawings, and particularly FIG. 11, a convertible top automobile is depicted incorporating the manually operated version of the present invention, in fragmentary form, including body structure 112 defining a passenger compartment 114. Side by side seats 116 are provided, with a space 118 to the rear thereof where luggage or other items to be stowed may be placed.

As in the previously described embodiment, the passenger compartment 114 is optionally covered with a convertible top 120, which may be of conventional design, including a collapsible frame including rear pillar members 123 and transverse bow members 122 having a fabric covering 124 stretched thereover.

Such convertible tops 120 are typically lowered into a U-shaped storage space 126 defined by the body structure 112 to the rear of the passenger compartment 114.

Figure 12:
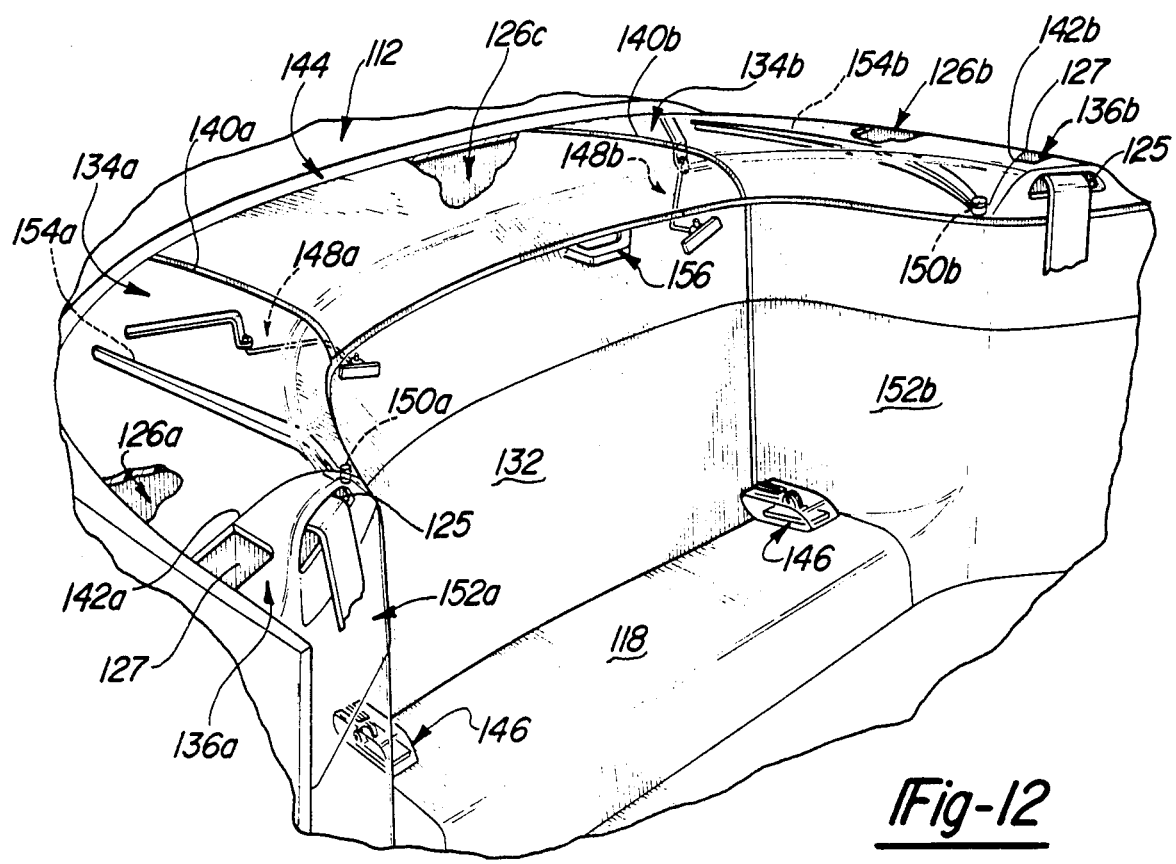
FIG. 12 is a fragmentary perspective view of the rear of the passenger compartment of the convertible top automobile shown in FIG. 11, with the tonneau cover mechanism in its normal covering position.
Figure 13:
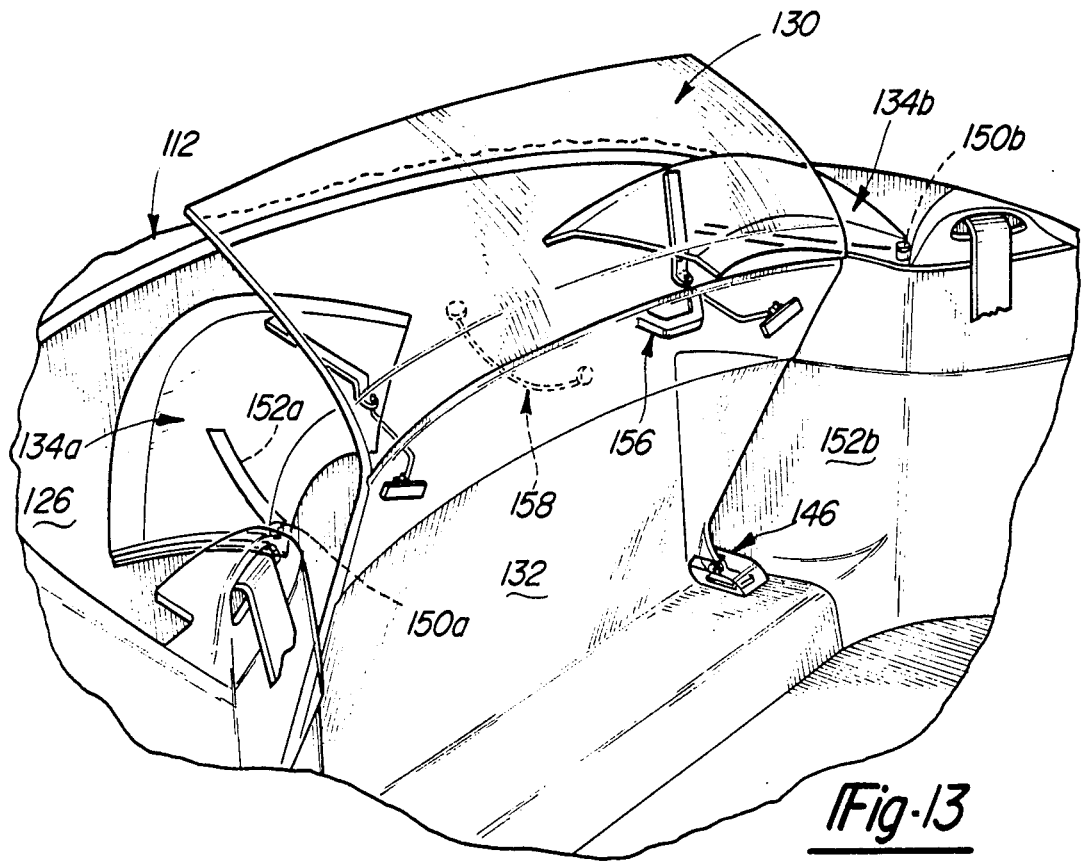
FIG. 13 is a view of the passenger compartment shown in FIG. 12 with the tonneau cover mechanism partially advanced to its uncovering position.

Referring to FIG. 12, the tonneau cover mechanism 128 in this version also includes a panel assembly including a main tonneau panel 130 configured to cover the storage space region 126c to the rear of an interior body panel 132 separating the space 118 and storage space 126.

Also included are right and left side covers 134a and 134b, each configured to cover the major portions of right and left side wells 126a and 126b respectively which form a part of the storage space 126. Cutouts 127 provide an opening for the rear pillars 123 of the convertible top 120 in the raised position. Cutouts 125 may also be provided to enable mounting of seat belt anchors within the side wells 126a, 126b as indicated.

Right and left fixed corner covers 136a and 136b complete the panel coverage of the U-shaped storage space 126.

Each of the main tonneau cover 130, side covers 134a and 134b, and fixed corner covers 136a and 136b are configured to be lapped to be interfit together along the contiguous edges to provide a trim exterior appearance.

A peripheral weather seal 144 is mounted to adjacent body structure 112 extending about the storage space 126, also acting to secure the edge of the fabric of the convertible top 120 to the body structure 112. Weather seal 144 is engaged by the peripheral outer edges of each of the main tonneau panel 130, side covers 134a and 134b, and fixed corner covers 136a and 136b.

Each of the main tonneau panel 130, right side cover 134a, left side cover 134b, fixed corner covers 136a, 136b as well as interior body panel 132 are preferably fabricated of lightweight rigid material, such as molded plastic or formed sheet metal.

The main tonneau panel 130 and interior body panel 132 are connected together, as by being formed in one piece, or by being fixedly joined together, to create an integral angled panel structure. The main tonneau panel 130 is cantilevered relative the interior body panel 132 to extend therefrom at a fixed angle, so that with the interior body panel 132 in a generally upright, vertical position, the main tonneau panel 130 extends generally horizontally to overlie storage space region 126c. The interior body panel 132 is hinged on either side at 146 to enable tilting forward of the integral structure formed by interior body panel 132 and main tonneau panel 131 from the vertical upright position so as to move the main tonneau panel 130 to uncover the storage space region 126c.

Each of the side covers 134a, 134b, are drivingly interconnected with the integral structure of the main tonneau panel 130 and interior body panel 132 with linkage means 148a and 148b respectively, to also produce an uncovering movement thereby upon tilting forward of the interior body panel 132. The side covers 134a and 134b are each mounted for pivoting motion at the forward inside corners thereof on a respective pivot pin 150a or 150b fixed to the interior side well body structure 152a, 152b, by means of support struts 154a, 154b, each pivoted on a respective pivot pin 150a, 150b, and affixed to the underface of a respective side cover 134a, 134b seen in FIG. 3.

Thus, as the body panel 132 is tilted forward about hinges 146, as by grasping and pulling handle 156, the side covers 134a and 134b are pivoted inboard as the main tonneau cover 130 moves off the storage space 126 by operation of the respective linkage means 148a and 148b.

A tether cable 158 is provided to limit the forward extent of such tilting motion, tether cable 158 anchored at either end to the body structure 112 and the inside of interior body panel 132.

Figure 14:
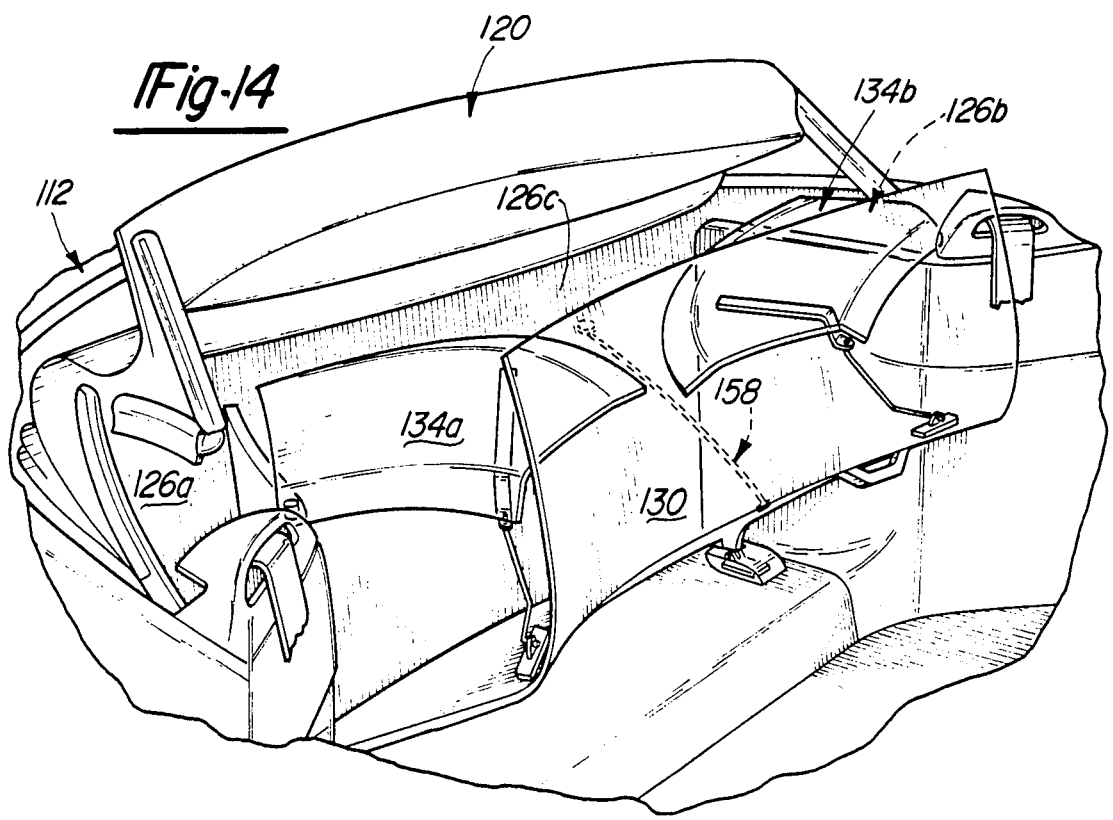
FIG. 14 is the same view as in FIGS. 12 and 13, with the tonneau cover mechanism advanced to its fully uncovered position, showing the convertible top partially moved out of its stowed position.

As seen in FIG. 14, the cable 150 is drawn taut at the forwardmost extent of tilt of interior body panel 132.

In this position, the side covers 134a and 134b have been pivoted inboard and both side covers 134a, 134b and main tonneau panel 130 are forward of the storage space region 126c, allowing the convertible top 120 to be raised or lowered out of storage space 126c.

Figure 15:
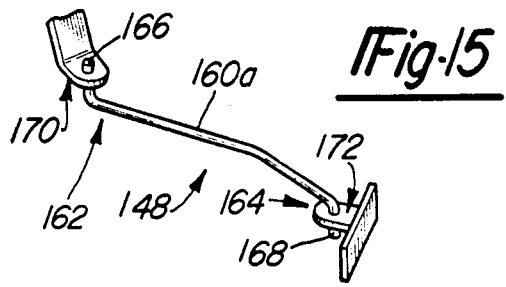
FIG. 15 is a detailed perspective view of an operator link included in the tonneau cover mechanism according to the present invention.
Figure 16:
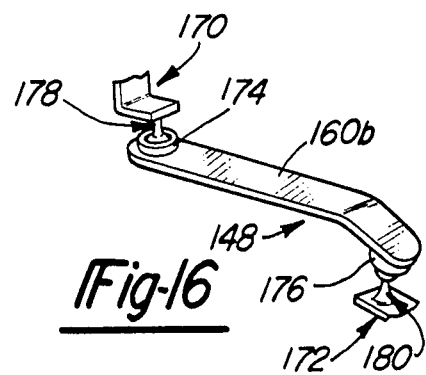
FIG. 16 is a detailed perspective view of an alternate form of the operator link and of the joints connection with the attaching brackets.
Figure 17:
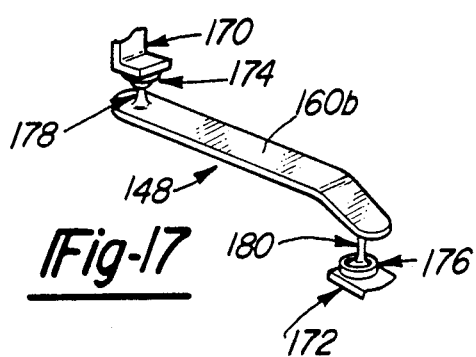
FIG. 17 is a perspective view of the alternate form of the operator link shown in FIG. 19, with an alternate form of joint connection with the attachment brackets.

Referring to FIGS. 15-17 further details of the components linkage means 148 can be seen.

The linkage means 148a and 148b comprise an angled rigid arm 160a having a pivot joint connection 162 and 164 at either end with the respective side cover 134a, 134b and the interior body panel 132. The pivot joint 162 and 164 each allow pivoting with a limited degree of swiveling to accommodate the relative motion of the arm 160a required. This may be provided by an arm formed of a rod having bent ends 166 and 168 received in chambered bores formed in brackets 170 and 172 affixed to the side covers 134a, 134b and the interior body panel 172 respectively. The chamfered seats allow the slight swiveling required.

Alternatively as shown in FIG. 16, the arm 160 can be provided by a blade shaped angled member 160b carrying sockets 174, 176 at either end receiving ball pins 178, 180 respectively attached to brackets 170, 172 to enable the rotation and swiveling required.

Finally, as shown in FIG. 17, the sockets 174, 176 can be affixed to the brackets 170, 172, and the ball pins attached to the ends of arm 160b.

Figure 18:
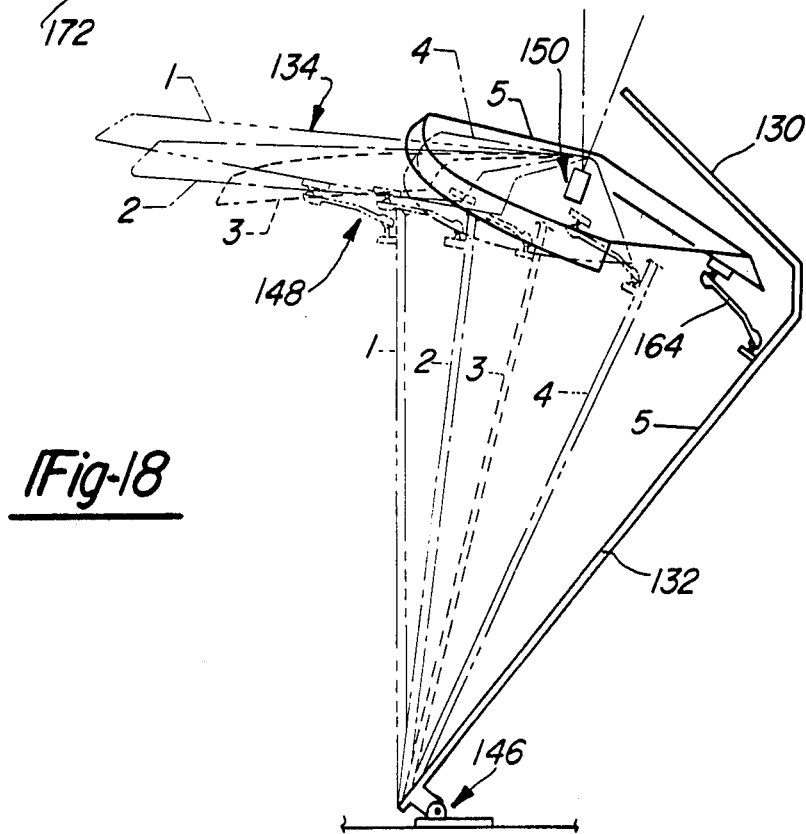
FIG. 18 is a diagrammatic side elevational view of the tonneau cover mechanism shown in FIGS. 11-14, with components thereof shown in successive positions assumed during opening by claims.
Figure 19:
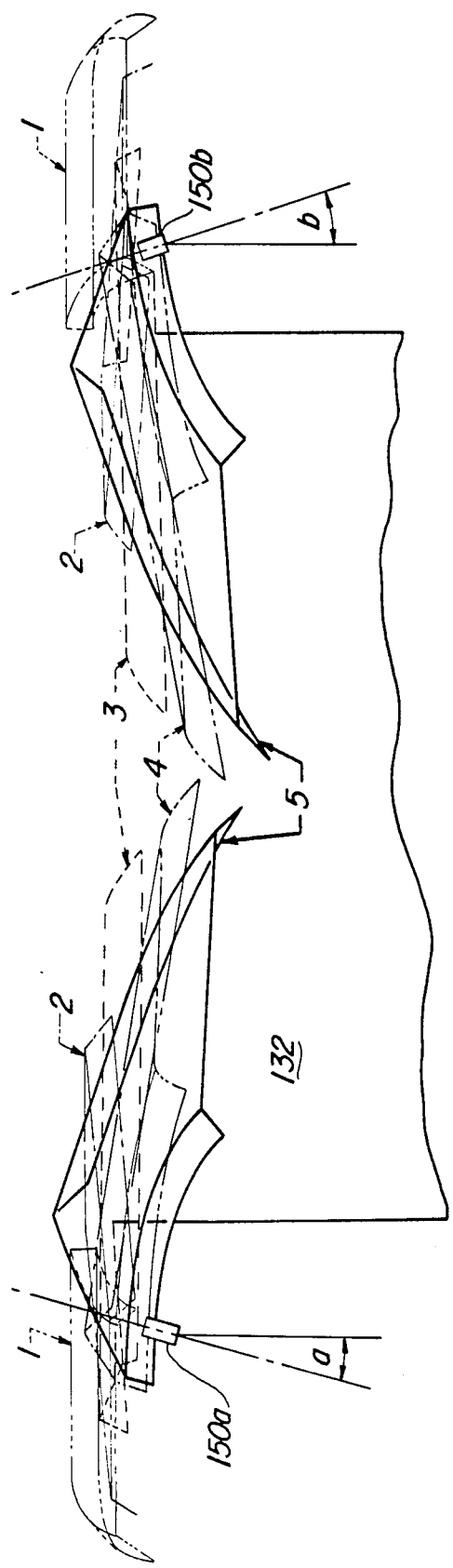
FIG. 19 is a diagrammatic rear elevational view of the tonneau cover mechanism shown in FIGS. 11-14, with the components thereof depicted in successive positions assumed during opening or closing.

Referring to FIGS. 18-20, the covers 134a and 134b pivot inboard and move beneath the main tonneau panel 130 in uncovering the side wells. In so doing, a lateral interference could occur as seen in FIG. 20. To avoid this, pivot pins 150a and 150b are skewed inwardly at slightly different angles a and b, (FIG. 19) so that each side cover 134a and 134b clears each other as they swing inward.

The pivot pins 150a and 150b are also skewed front-to-rear to allow a sloping covering position (FIG. 19), and an upward angle beneath the main tonneau panel 30 to afford additional clearance for movement of the top 20, past these components in being raised or lowered.

Accordingly, it can be appreciated that by the disclosed arrangement, the above recited objects of the present invention have been achieved in that highly aesthetic treatment of the tonneau cover has been afforded which allows a simplified operation in raising and lowering the convertible top between the stored and raised portions and which also provides a covering of the storage space 16 with the top in the raised and stored positions. The tilting motion of the passenger seat 22 and body panel 40 forward carrying the tonneau cover assembly eliminates the need to separately place the tonneau cover in position.

While a particular configuration has been described, it should be understood that the concept may be adopted to varying vehicle configurations.

I claim:

1. In a convertible top automobile including a body structure defining a passenger compartment, and also defining a generally U-shaped storage space to the rear of said passenger compartment said storage space having a main portion and a pair of side wells on either side thereof, a foldable top adapted to be collapsed into said storage space, an interior body panel located at the rear of said passenger compartment defining in part said main storage space, said automobile also including in combination therewith an improved tonneau cover mechanism comprising:

hinge means pivotally mounting said interior body panel to be tilted from a normal generally upright position forwardly away from said storage space; a main tonneau panel fixedly cantilevered from the upper side of said interior body panel to form an integral angled panel structure configured to overlie said storage space with said interior body panel in said upright position, said main tonneau panel carried forward as said body panel is tilted forward from said upright position to uncover said storage space;

a pair of substantially rigid side covers, each configured to overlie a respective side well;

means pivotally mounting each of said side covers to said body structure for rotation about an axis between a position overlying said respective side well and a position substantially inboard within said passenger compartment in which said side well portions are uncovered; and, further including linkage means interengaging said integral angled panel structure and each of said side covers causing pivoting of each of said side covers between said overlying and inboard positions as said angled panel structure is tilted between said upright and forward positions, whereby both said main tonneau panel and said side covers are moved to cover and uncover said storage space by tilting movement of said interior body panel between said upright and forward tilted positions.

2. The tonneau cover mechanism according to claim 1 wherein each of said side covers are pivoted beneath said main tonneau panel in said inboard position.

3. The tonneau cover meachanism according to claim 2 wherein each of said pivot axes are inclined from the vertical to a slightly differing degree from each other, whereby the respective side covers swing in different planes to eliminate interference as said side covers swing inboard.

4. The tonneau cover mechanism according to claim 1 wherein said linkage means comprises a pair of angled rods extending between a respective side cover and said angled panel structure, each pivotally connected at one end to said integral angled panel structure and at the other end to a respective side cover.

5. The tonneau cover mechanism according to claim 1 further including a tether cable connected at one end to said integral structure, and at other end to said automobile body structure to limit forward tilting of said interior body panel.

* * * * *

UNITED STATES PATENT AND TRADEMARK OFFICE
CERTIFICATE OF CORRECTION

PATENT NO. : 4,799,729

DATED : January 24, 1989

INVENTOR(S) : Peter P. Muscat

It is certified that error appears in the above-identified patent and that said Letters Patent is hereby corrected as shown below:

Column 3, line 37, "perpsective" should be --perspective--.

Column 10, line 8, "meachanism" should be --mechanism--.

Signed and Sealed this

Eleventh Day of July, 1989

Attest:

DONALD J. QUIGG

Attesting Officer

Commissioner of Patents and Trademarks